(12) United States Patent
Chamberlain et al.

(10) Patent No.: US 6,411,746 B1
(45) Date of Patent: Jun. 25, 2002

(54) THERMALLY TUNABLE OPTICAL DEVICES

(75) Inventors: Darol Chamberlain, Ithaca; Gang Chen, Horseheads; Steven B. Dawes, Corning; Peter J. McNeilly; Mike X. Ouyang, both of Painted Post; Laura A. Weller-Brophy, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/484,491

(22) Filed: Jan. 18, 2000

(51) Int. Cl.$^7$ .......................... G02F 1/035; G02B 6/22; G02B 6/26

(52) U.S. Cl. ............................ 385/2; 385/10; 385/37; 385/40; 385/128

(58) Field of Search ............................ 385/1, 2, 8, 10, 385/12, 15, 27, 31, 37, 39, 40, 101, 123, 128, 140, 147

(56) References Cited

U.S. PATENT DOCUMENTS

| | | | |
|---|---|---|---|
| 4,621,261 A | 11/1986 | Hehlen et al. | 340/825.52 |
| 4,788,406 A | * 11/1988 | Holman et al. | 385/128 X |
| 5,007,705 A | 4/1991 | Morey et al. | 350/96.29 |
| 5,459,799 A | 10/1995 | Weber | 385/2 |
| 5,497,442 A | * 3/1996 | Roos et al. | 385/128 |
| 5,574,815 A | * 11/1996 | Kneeland | 385/101 |
| 5,699,468 A | 12/1997 | Farries et al. | 385/140 |
| 5,706,375 A | 1/1998 | Mihailov et al. | 385/24 |
| 5,841,918 A | 11/1998 | Li | 385/24 |
| 5,987,200 A | 11/1999 | Fleming et al. | 385/37 |
| 6,271,952 B1 | 8/2001 | Epworth | 359/161 |

FOREIGN PATENT DOCUMENTS

| | | | |
|---|---|---|---|
| EP | 0867736 A2 | 9/1998 | G02B/6/16 |
| JP | 4-19601 | * 1/1992 | 356/73.1 |
| JP | 05 150275 A | 6/1993 | |
| JP | 07 084225 A | 3/1995 | |
| JP | 08 029813 A | 2/1996 | |

OTHER PUBLICATIONS

"Efficient Miniature Fiber–Optic Tunable Filter Based on Intracore Bragg Grating and Electrically Resistive Coating", by H.G. Limberger, et al, IEEE Photonics Technology Letters, vol. 10, No. 3, Mar. 1998, pp. 361–363.

"Temperature stabilised operation of tunable fibre grating devices that use distributed on–fibre thin film heaters", by J.A. Rogers, et al, Electronics Letters, vol. 35, No. 23, Nov. 11, 1999, pp. 2052–2053.

"Wavelength tunable fiber Bragg grating devices based on sputter deposited resistive and piezoelectric coatings", G. R. Fox et al, J. Vac. Sci. Technol. A, vol. 15, No. 3, May/Jun. 1997, pp. 1791–1795.

"Fast and widely tunable Bragg grating reflection filter", A. Iocco et al, Optical Fiber Conference 1999, 3 pages.

\* cited by examiner

*Primary Examiner*—John D. Lee
(74) *Attorney, Agent, or Firm*—Eric M. Smith

(57) ABSTRACT

The present invention relates to a tunable optical device 10 that includes an optical fiber device 12 having optical properties that vary with temperature and a heater 14. The heater 14 is thermally coupled to the optical fiber device 12. The heater 14 includes a metal layer 18 and two electrical contacts 20, 22 that are electrically connected to the metal layer 18. The electrical contacts 20, 22 are spaced apart from one another along the metal layer 18. The electrical resistance of the portion of the metal layer 18 between the contacts 20, 22 varies with temperature and serves as a resistive heater. The invention also includes a controller 16 that is electrically connected to the heater 14. The controller 16 provides electrical power to the heater 14 and measures the electrical voltage across the heater 14. The controller 16 compares the measured electrical voltage to a pre-selected reference value. The controller then regulates the amount of electrical current supplied to the heater 14. By regulating the amount of electrical current supplied to the heater 14 the temperature of the heater 14 is controlled.

32 Claims, 10 Drawing Sheets

THERMALLY TUNABLE OPTICAL DEVICES

BACKGROUND OF THE INVENTION

1. Field of the Invention

The present invention relates generally to thermal control of opto-electronic devices and particularly to the control of optical properties of an optical fiber device by thermal manipulation.

2. Technical Background

Many optical devices have optical properties that change with changes in temperature. Examples of these devices are fiber Bragg gratings (FBGs), long period gratings (LPGs) and Mach-Zehnder devices. These devices are used in many optical applications; in particular, fiber Bragg gratings are used in wavelength add-drop multiplexers where one particular wavelength is added or dropped from a series of multiplexed wavelength signals transmitted in a single optical waveguide fiber. Long period gratings and tunable long period gratings are used in gain flattening and gain equalization applications. The center wavelength of a grating may be changed by subjecting the grating to mechanical strain or operating the grating at different temperatures.

One approach utilizing thermo-optic properties to tune an optical device requires active monitoring of the optical signal being processed by the device. Traditionally this is accomplished using an optical feedback control system.

SUMMARY OF THE INVENTION

The present invention relates to athermalizing optical elements and tuning one or more of the optical properties of the optical element by controlling the heat applied to the optical elements.

One aspect of the present invention is a tunable optical device that includes an optical fiber device having optical properties that vary with temperature, and a resistive heater. The resistive heater includes a metal layer that is thermally coupled to the optical fiber device and two electrical contacts that are electrically connected to the metal layer. The electrical contacts are spaced apart from one another along the metal layer, and the portion of the metal layer between the contacts is the region that serves as the resistive heater. The invention also includes a controller that is electrically connected to the contacts. The controller both provides electrical power to the heater and measures the electrical voltage across the heater. The controller compares the measured voltage across the heater to a pre-selected reference value. The controller then regulates the amount of electrical power supplied to the heater. By regulating the amount of electrical current supplied to the heater the temperature of the heater is controlled.

One advantage of the present invention over prior methods of controlling the optical properties of an optical fiber device by thermal means is that the present invention incorporates the temperature sensor and heater element into one element. This is accomplished by using a resistive heater having a temperature dependent electrical resistance and measuring the resistance of the heating element. Traditionally, separate mechanisms for measuring the temperature, such as thermocouples, are used. The use of a separate heater and sensor requires a more complex control circuit and device packaging.

Another advantage of the present invention is that when the combination heater/sensing element is a metallized tube, the assembly process is greatly facilitated. The improvements in the assembly and fabrication processes are due in large part to not having to metallize fiber gratings, thus, the difficulty in metallizing a fiber is avoided. Furthermore, the system is usable with long period gratings. For optical property reasons tunable long period gratings must be surrounded with a material of a specific index of refraction, such as a sol gel material. The slotted tubular heater when used for long period grating packaging provides a reservoir area for putting the sol gel or polymer material in, until it can be thermally cured around long-period grating.

Another advantage of the present invention is realized by setting the temperature of the optical fiber device at a fixed level above the environmental operating range of the module into which it is to be installed. This form of packaging achieves an effective, low cost, and simple active athermalization of the device; this ensures stability of the desired optical properties throughout the entire environmental operating range specified for the module in which the device is installed.

An advantage of the invention is that it has compact size, which is increasingly important as the trend in optical systems is to require greater numbers of optical components fit in a given space.

Yet another advantage of the invention is that can be used as a temperature controlled tension/compression tuned fiber Bragg grating. The tubular heater can be put on a grating section and can hold the grating at a constant temperature that is slightly above the maximum operating temperature. The center wavelength of the fiber Bragg grating is now determined solely by the tension/compression applied to the grating. A low glass transition temperature material is preferred as the filling around the fiber Bragg grating, so the tension/compression on the grating does not cause any stress on the metal coating that is on the inner wall of the slotted tubular heating sensing element.

Yet another advantage of the present invention is that it may be used to make a thermally chirped fiber Bragg grating. By applying a temperature gradient along a fiber Bragg grating length, the fiber Bragg grating can be thermally chirped to change the grating bandwidth and dispersion, which are useful in wavelength add-drop multiplexing and dispersion management applications. A thermal gradient can be generated using the tubular heater embodiment of the present invention. A number of heaters, separated by distances that depend on the chirping effects in a thermal gradient that is to be established, are placed along the length of the grating and these heaters are then operated at different temperatures. Alternatively, a temperature gradient may be generated by modifying the effective resistance per unit length of the metal coating of a single tubular heating element. This may be accomplished by laser ablation of the metal layer.

Another advantage of the invention is that it can be used to produce a dual heater thermally chirped fiber Bragg grating. This is accomplished by using two independent heating elements that are coaxially arranged around a fiber grating. A segmented heater as described above may be used to generate a degree of chirp, and a second segmented or uniform heater can be used to set the bias point of the temperature of the grating. In this manner, chirp and center wavelength can be controlled independently. Another advantage of this configuration is that control over the spectral and dispersive properties of the fiber grating is facilitated.

Another advantage of the present invention is that it allows a fiber optical device to be calibrated and assembled with its controller into a single discrete package.

Another advantage of the present invention is that the calibration of each optical device during the assembly process greatly facilitates adjusting the center wavelength of the device.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
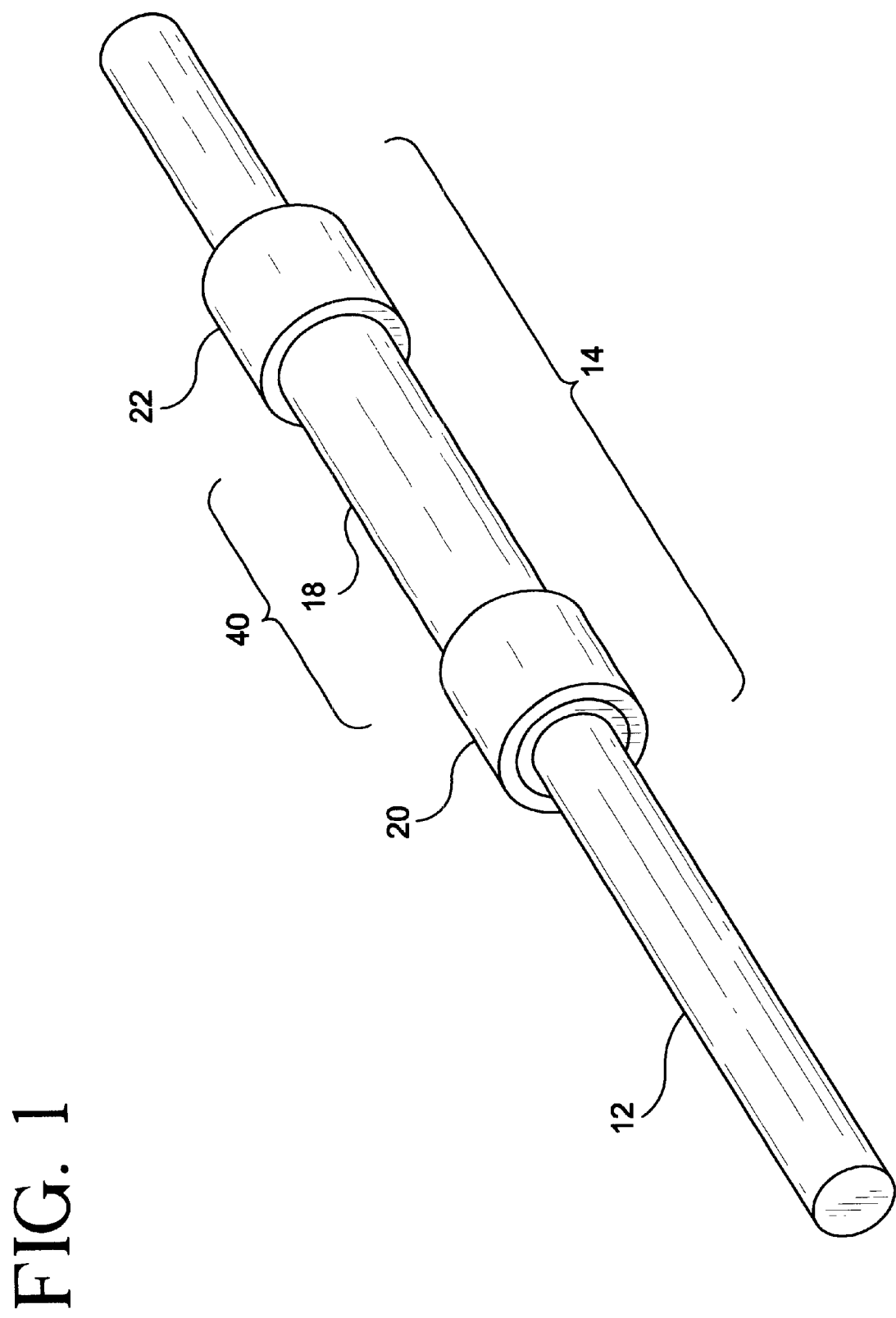
FIG. 1 is a perspective view of a thermally tunable optical device in which the present invention is embodied.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the thermally tunable optical device of the present invention is shown in FIG. 1, and is designated generally throughout by reference numeral 10.

In accordance with the invention, the present invention for a thermally tunable optical device includes an optical fiber device 12. The optical fiber device 12 possesses optical properties that vary with temperature. Exemplary of the optical fiber device 12, are fiber Bragg gratings, long period gratings and Mach-Zehnder devices.

As embodied herein, and depicted in FIG. 1, the tunable optical device 10 includes a heater 14. The heater 14 includes a metal layer 18 and a first electrical contact 20 and a second electrical contact 22 that are spaced apart from one another. The metal layer 18 is a thin metallic film coated onto the surface of an optical fiber device 12. Exemplary of processes that may be used to form the metal layer 18 are sputtering the metal onto the optical fiber device 12 and evaporating metal onto the optical fiber device 12 in a vacuum. The criteria for choosing the metal for the metal layer 18 are good adhesion to the optical fiber device 12, good resistance stability and a constant temperature coefficient of resistance (TCR) in the temperature controlling window. Preferably, the resistance of the metal varies linearly with temperature. Exemplary metals for the metal layer 18 are Platinum and Platinum applied over a thin layer of Titanium-Nitride. The metal layer 18 may have either a constant thickness or a variable thickness between the first and second electrical contacts 20, 22. Varying the thickness of the metal layer 18 allows the heater 14 to provide a thermal gradient along the length of the optical fiber device 12. Variations in thickness of the metal layer 18 may be accomplished by masking in the deposition process or ablation after the deposition process is completed. Exemplary of which would be using a laser to remove material.

The electrical contacts 20, 22 may be formed by masking the region of the metal layer 18 that is to form the resistive heating region 40 and using sputtering or vacuum deposition to deposit an electrically conductive material. Because the thickness of the first and second electrical contacts 20, 22 is greater than that of the metal layer 18, their resistance is negligible. Exemplary materials for the first and second electrical contacts 20, 22 are Platinum, Gold, and an alloy of Copper and Gallium.

Figure 2:
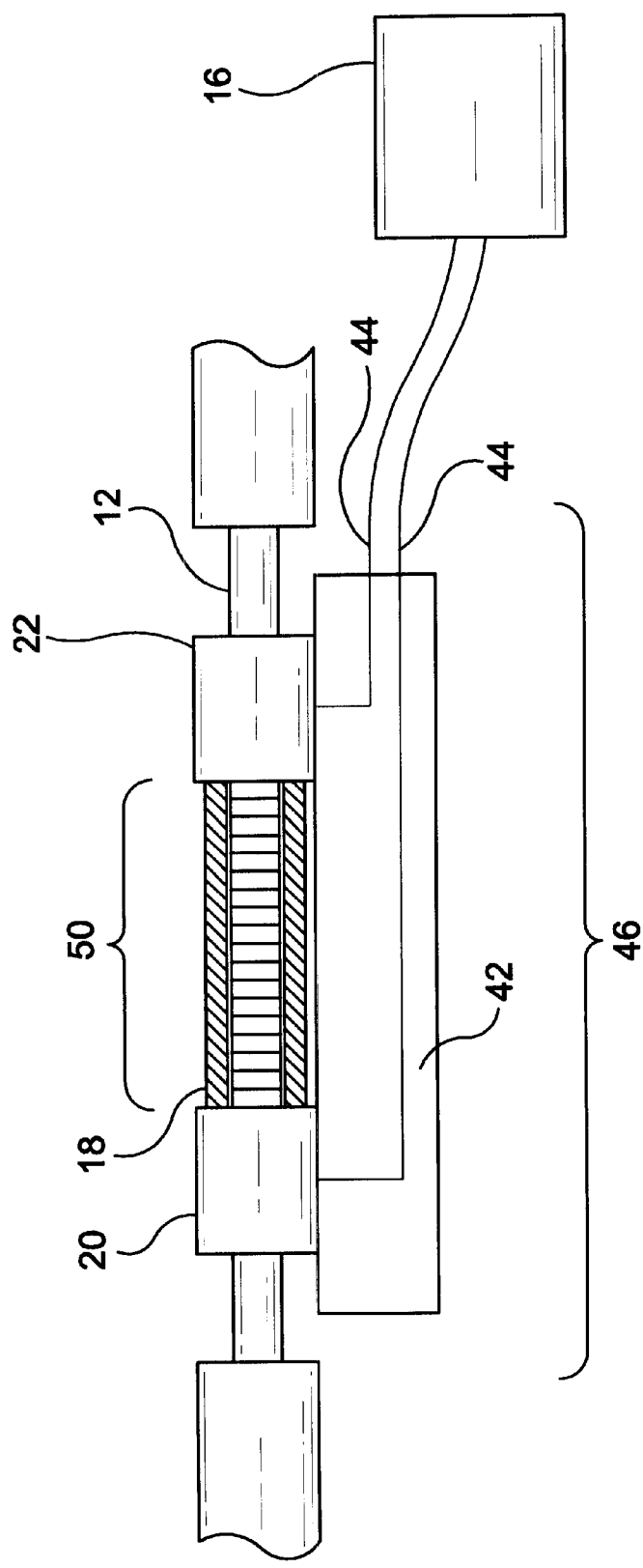
FIG. 2 is a cross-sectional view of a thermally tunable optical device in which the present invention is embodied.

As embodied herein, and shown in FIG. 2, the tunable optical device may be mounted to a substrate 42. The optical fiber device 12 is tensioned and attached to a substrate 42 that has two metallized strips 44 forming an assembly 46. The substrate 42 is a zero-expansion material, typically a ceramic, glass or glass-ceramic. Exemplary of suitable materials are filled polymer substrates that match the thermal expansion characteristics of the optical fiber devcie 12 and ULE® glass manufactured by Corning Incorporated of Corning, N.Y. Tensioning the optical fiber device 12 ensures that when the optical fiber device 12 is a fiber Bragg grating that the grating portion 50 of the optical fiber device 12 remains straight throughout the range of operating temperatures. When the optical fiber device 12 is a fiber Bragg grating and the substrate 42 is an ultra-low expansion material, neither the grating temperature nor the ambient temperature influences the total length of the grating 50. Therefore, the only factor influencing the center wavelength of the grating is the grating temperature. A non-creeping solder, such as a gold and tin alloy solder, may be used to attach the heater 14 to the metallized strips 44. The metallized strips may serve as electrical leads connecting the heater 14 to a controller 16, or separate electrical leads may be used to connect the heater 14 to a controller 16. This assembly 46 may then be placed in a closed package (not shown), having provisions for electrical connection to a controller 16, for environmental protection.

Figure 3:
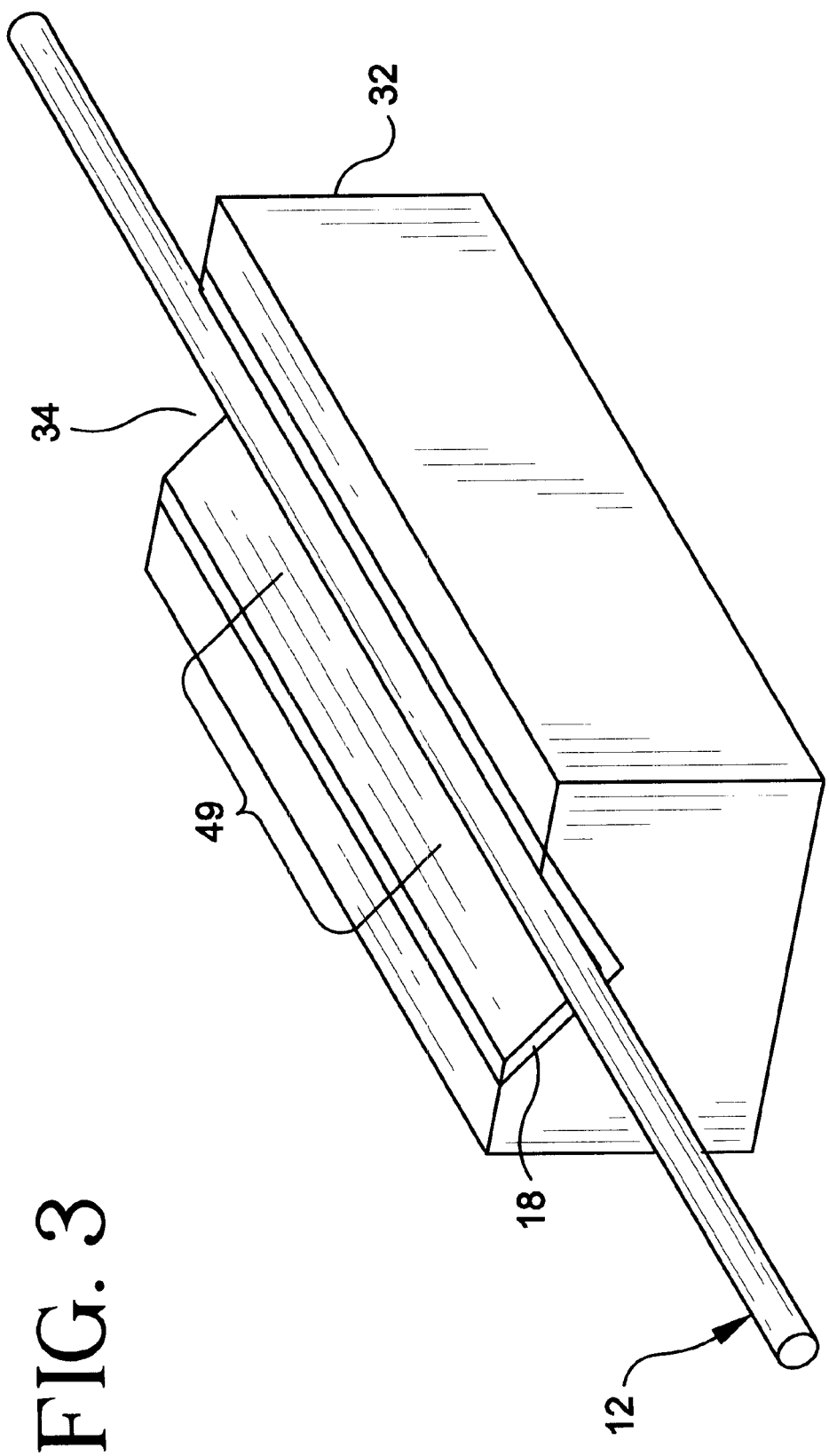
FIG. 3 is a perspective view of a thermally tunable optical device in which the present invention is embodied.

In an alternate embodiment of the invention, as embodied herein and as shown in FIG. 3, the heater 14 includes a metal layer 18 deposited on the sides of a groove 34 in a substrate 32. The substrate may be silica, glass or another material chosen to obtain specified thermal response characteristics. Exemplary of this embodiment is the tunable optical device 10 shown in FIG. 4, this embodiment includes a slotted heater 36 in which the substrate 42 is a capillary tube with an axial bore 62 larger than the diameter of the optical fiber device 12. In an exemplary embodiment the diameter of the axial bore 62 is 2 to 4 times that of the optical fiber device 12. In some cases a thin walled capillary tube is chosen to reduce the thermal mass of the heater 14. A slot 38 is formed extending the entire length of the capillary tube. The width of the slot 38 is slightly larger than the diameter of the optical fiber device 12. As illustrated in FIG. 3, preferably the heater 14 is longer than the portion of the optical fiber device 12, to be thermally tuned 49.

After the slot 38 is made, the metal layer 18 is deposited on the inside of the capillary tube. At each end of the capillary tube, metal strips form a first electrical contact 20 and a second electrical contact 22 that are spaced apart from one another. The first and second electrical contacts 20, 22 have a lower resistance per unit length than the metal layer 18. Electrical leads (not shown) may be soldered to the first and second electrical contacts.

Figure 4:
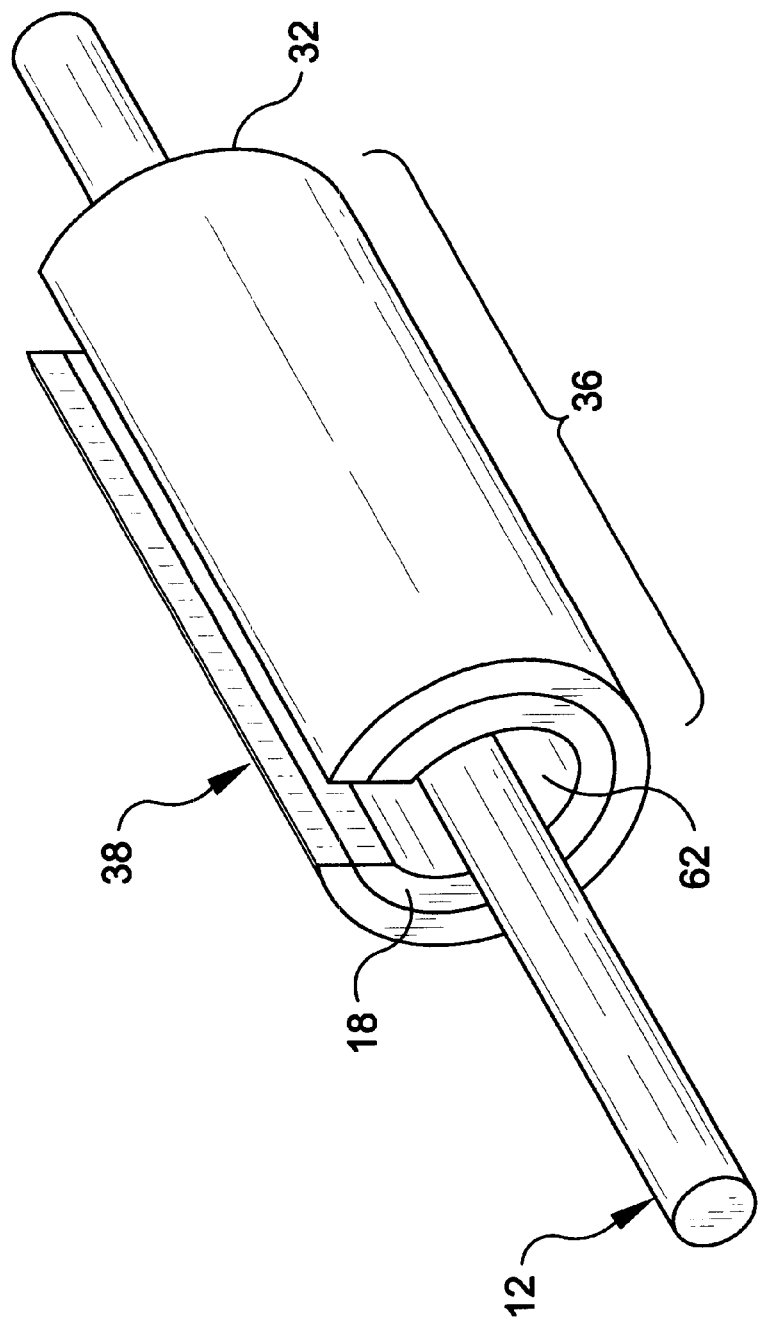
FIG. 4 is a perspective view of a thermally tunable optical device in which the present invention is embodied.
Figure 5:
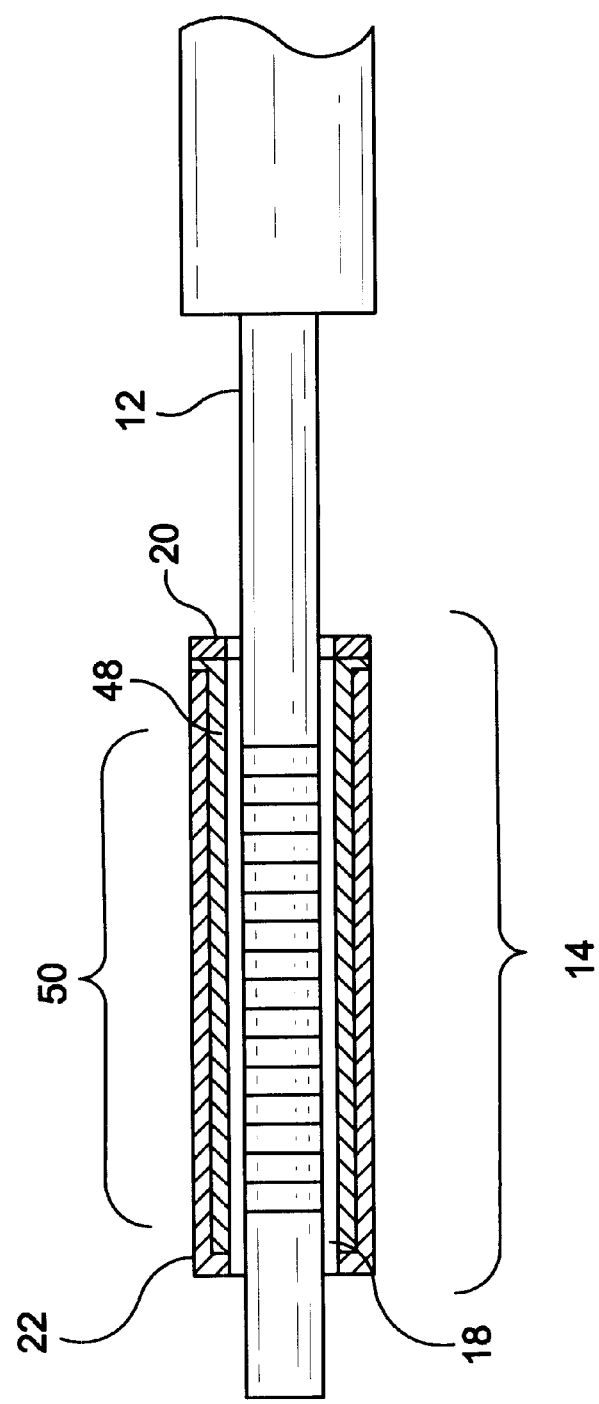
FIG. 5 is a cross-sectional view of a thermally tunable optical device in which the present invention is embodied.

Because long period gratings are tuned by changing the refractive index of the material surrounding the cladding layer of the fiber, the slotted heater embodiment shown in FIG. 4 is particularly suitable for use with long period gratings. In a typical embodiment, the region between the metal layer 18 and the optical fiber device 12 is filled with a hybrid organic/inorganic, glass or glass-ceramic material produced by a sol-gel process. Hybrids, glass and glass ceramics produced using the sol gel process have indices of refraction that are temperature sensitive in the desired operating regime.

In another alternative embodiment of the invention, as embodied herein and as shown in FIG. 4, the thermally tunable optical device 10 includes a heater 14 surrounding an optical device 12. This embodiment of the invention is particularly suited for active athermalization of a fiber Bragg grating. A metal layer 18 covers the portion of the optical fiber device 12 having the grating 50. The metal layer 18 is then partially masked and an insulating layer 48 is placed over the unmasked portion of the metal layer 18. A first electrical contact 20 is added to one end of the heater and a second electrical contact 22 is electrically connected to the other end of the metal layer 14. The second electrical contact 22 extends over the insulating layer 48, so that electrical connection to both electrical contacts 20, 22 may be made at the same end of the heater 14. The first and second electrical contacts 20, 22 are connected to a controller 16.

Figure 6:
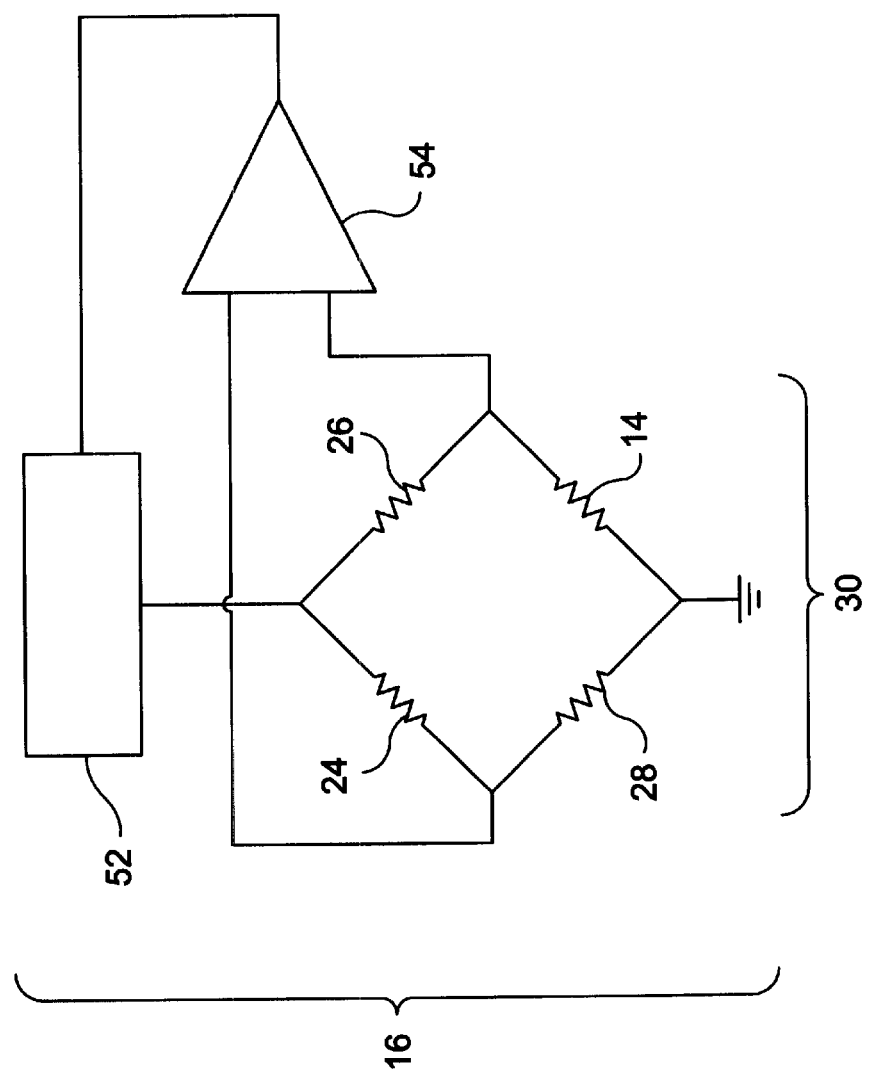
FIG. 6 is a schematic electrical circuit diagram of an embodiment of the present invention.
Figure 10:
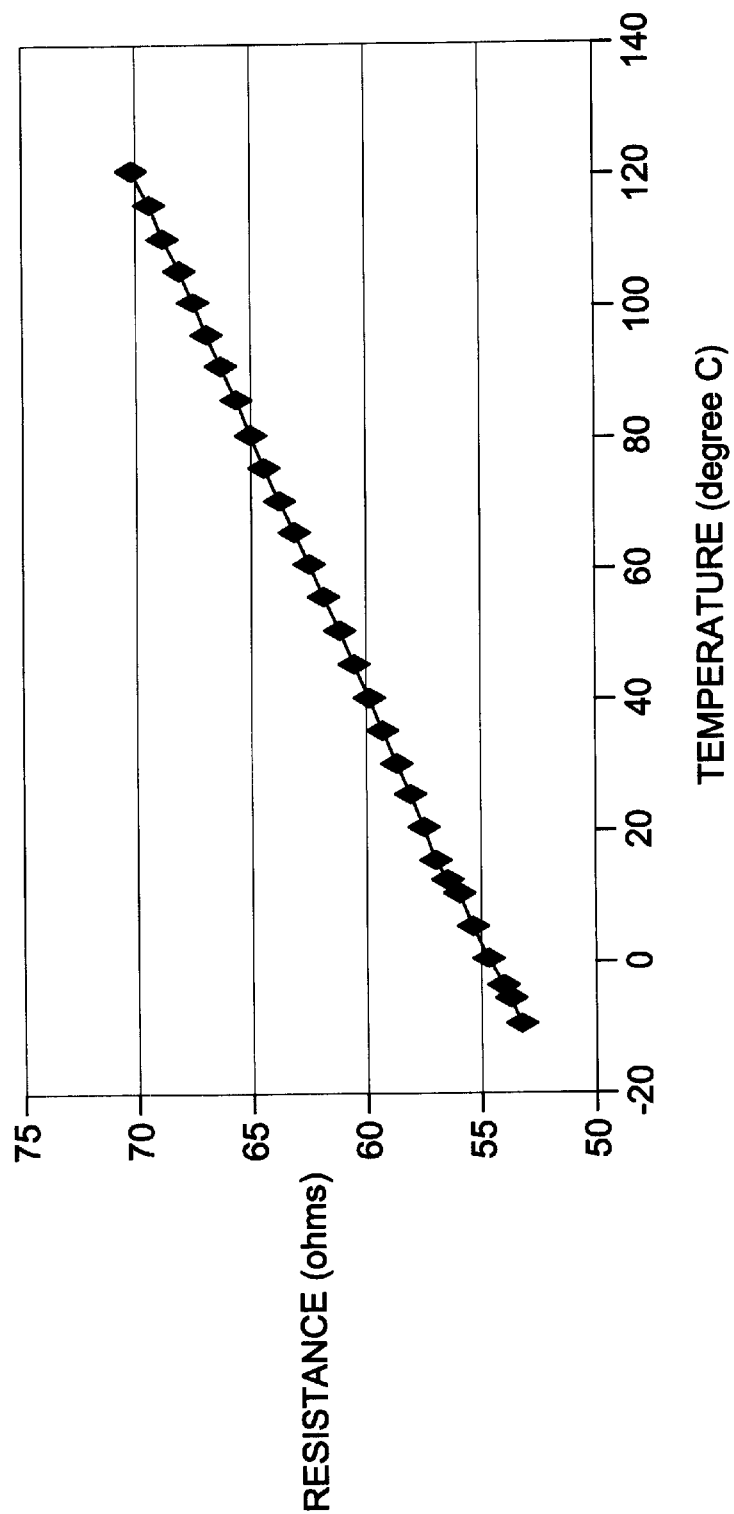
FIG. 10 is a chart of the relationship between electrical resistance and temperature for Platinum.

As embodied herein, and depicted in FIG. 6, the tunable optical device 10 includes a controller 16. The optical properties of the optical fiber device 12 depend upon the temperature of the optical fiber device 12. Exemplary of this is the variation of the center wavelength of a fiber Bragg grating with temperature. The resistance of the metal layer 18 of the heater 14 changes with temperature. Illustrative of this temperature dependence is FIG. 10, which shows the increase in resistance of a layer of platinum as the temperature of the layer increases. By taking advantage of the thermoelectric properties of the metal layer 18 of the heater 14 and the thermo-optic properties of the optical fiber device 12 a thermally tunable optical device may be realized.

The controller includes an electrical power source for providing electrical power to the heater 14 and the controller 16. Three resistors 24, 26, 28 are electrically connected to one another and the heater 14 in a Wheatstone bridge 30 configuration. A Wheatstone bridge circuit 30 is electrically balanced when the ratio of the resistances of the resistors in one arm of the bridge is equal to the ratio of the resistances of the resistors in the other arm of the bridge.

The controller 16 functions by comparing ratio of the resistance of the heater 14 to the resistance of the resistor 26 to the ratio of the resistance of resistor 28 to the resistance of resistor 24. If these ratios are different then the Wheatstone bridge 30 portion of the controller is unbalanced and the error detector 54 generates a signal. Exemplary of error detectors 54 are operational-amplifiers or equivalent circuitry. The signal generated by the error detector controls the output from the power source 52.

The resistance of the heater 14, in a balanced Wheatstone bridge is given by equation 1.

$$R_{14} = R_{26} \frac{R_{28}}{R_{24}} \quad \text{Equation 1}$$

Where
$R_{14}$ is the resistance of in ohms the metal layer 18;
$R_{24}$ is the resistance in ohms of the resistor 24;
$R_{26}$ is the resistance in ohms of the resistor 26; and
$R_{28}$ is the resistance in ohms of the resistor 28.

Because both the optical properties of the optical fiber device 12 and the electrical properties of the heater 14 depend on temperature, it is possible to select an operating point for the optical fiber device 12. One the required operating temperature of the optical fiber device 12 is determined, resistors 24, 26, 28 are chosen, according to equation 1, to balance the Wheatstone bridge 30 at that operating temperature. In an exemplary configuration, the tunable optical device would be either a fiber Bragg grating or a long-period grating encapsulated by a heater 14. Resistors 24 and 26 of the Wheatstone bridge 30 would have fixed value. Resistor 28 of the Wheatstone bridge 30 as shown in FIG. 6 is a variable resistor the exemplary of which are potentiometers. Preferably resistors 24 and 26 and resistor 28 are precision resistors. A precision resistor is a resistor whose resistance properties do not depend on temperature within a chosen operating range. In this configuration, the optical fiber device 12 may be athermallized by selecting an operating temperature above the operating range for the optical device in which is to be incorporated. Typically, the specified operating temperatures for the optical device have an upper limit of 70–80° C. In order to produce a reliable optical device, the resistance of resistors 24, 26 and 28 are selected to give a desired optical property in the optical fiber device 12 when the operating temperature of the optical fiber device 12 is above 80° C. Exemplary of this would be tuning the optical fiber device 12 when it is a fiber Bragg grating to have certain center wavelength. As long as that certain center wavelength corresponds to a temperature of above 80° then the device is athermallized. The optical fiber device 12 is kept at the selected temperature by the heater 14. Because the resistance of the heater 14 changes with temperature, the Wheatstone bridge 30 will become unbalanced and the error detector 54 will generate a signal when the temperature of the optical fiber device 12 falls below the selected temperature. When ambient temperature decreases, the temperature of the optical fiber device 12 falls below the selected temperature, the bridge circuit 30 becomes unbalanced and the error detector 54 produces a signal that goes to the power source 52. The power source 52 is then commanded to output more electrical current to the Wheatstone bridge. As more electrical current is delivered to the Wheatstone bridge 30 the temperature of the heater 14 increases, which in turn, raises the resistance of the heater 14, thus bringing the bridge circuit 30 back into balance. Conversely, if the ambient temperature surrounding the thermally tunable optical device 10 rises, the heater 14 becomes too hot. The bridge circuit 30 becomes unbalanced and the error detector 54 again generates a signal, however, the signal generated is of the opposite polarity to the signal generated when the heater 14 has dropped below its operating temperature. The signal generated by the error detector 54 commands the power source 52 to send less electrical power to the Wheatstone bridge 30, therefore, there is less electrical power for the resistors 24, 26, 28 and the heater 14 to convert to thermal energy. Leading to a decrease in the temperature of the heater 14 and a corresponding decrease in the temperature of the optical fiber device 12, bringing the optical characteristics of the optical fiber device 12 back to the design operating point.

In tests, a device as described above, using a fiber Bragg grating as the optical fiber device 12 exhibited a surprising degree of athermalization. With the device heated to 80° C., the ambient temperature surrounding the device was cycled from −10° C. to 70° C. with only a 12-picometer shift in the center wavelength of the fiber Bragg grating. The same device, when tested for tunablity, demonstrated a 10 picometer per degree Centigrade shift in center wavelength. The following example illustrates the tuning of a grating to a different center wavelength. If a fiber Bragg grating has a center wavelength of 1550 nm at 80° C., then to shift center wavelength to 1550.400 nm the fiber Bragg grating would be heated to 120° C.

Figure 7:
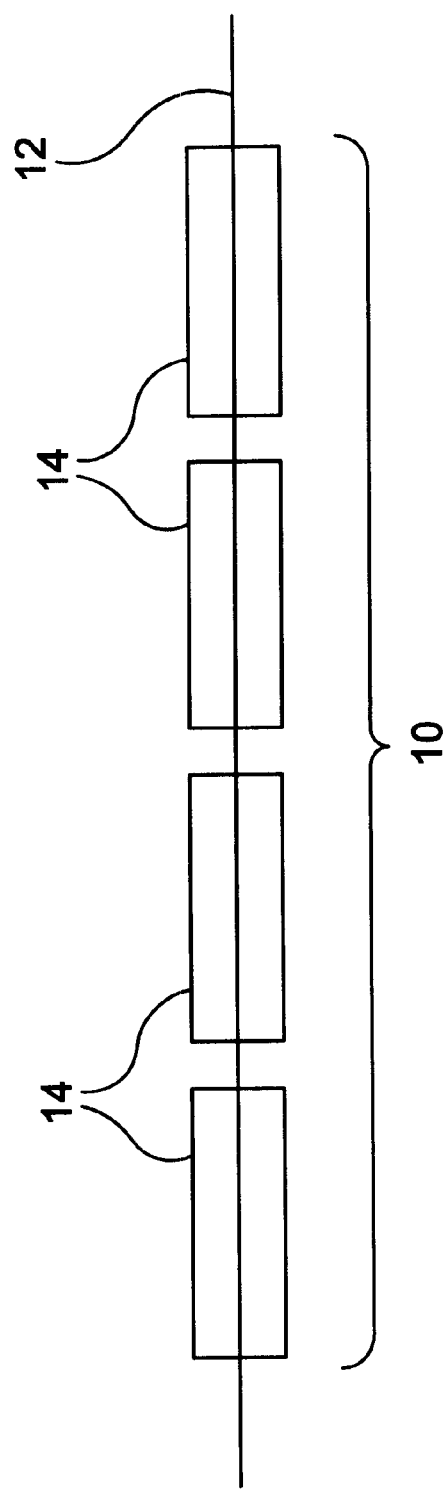
FIG. 7 is a schematic representation of a thermally tunable optical device in which the present invention is embodied.

In another alternative embodiment of the invention, as embodied herein and shown in FIG. 7 the thermally tunable optical device 10 includes an optical fiber device 12 having optical properties that vary with temperature. A series of heaters 14 are used to establish a thermal gradient along a length of the optical fiber device 12. In this way, a fiber Bragg grating may be thermally chirped to change the grating's bandwidth and dispersion characteristics. The ability to thermally chirp a grating is of particular significance in the manufacture and operation of wavelength add/drop multiplexers. Alternatively, a single heater 14 with differing effective resistance per unit area may be used to chirp the grating. A controller 16 is used to operate each heater 14 at its desired temperature.

Figure 8:
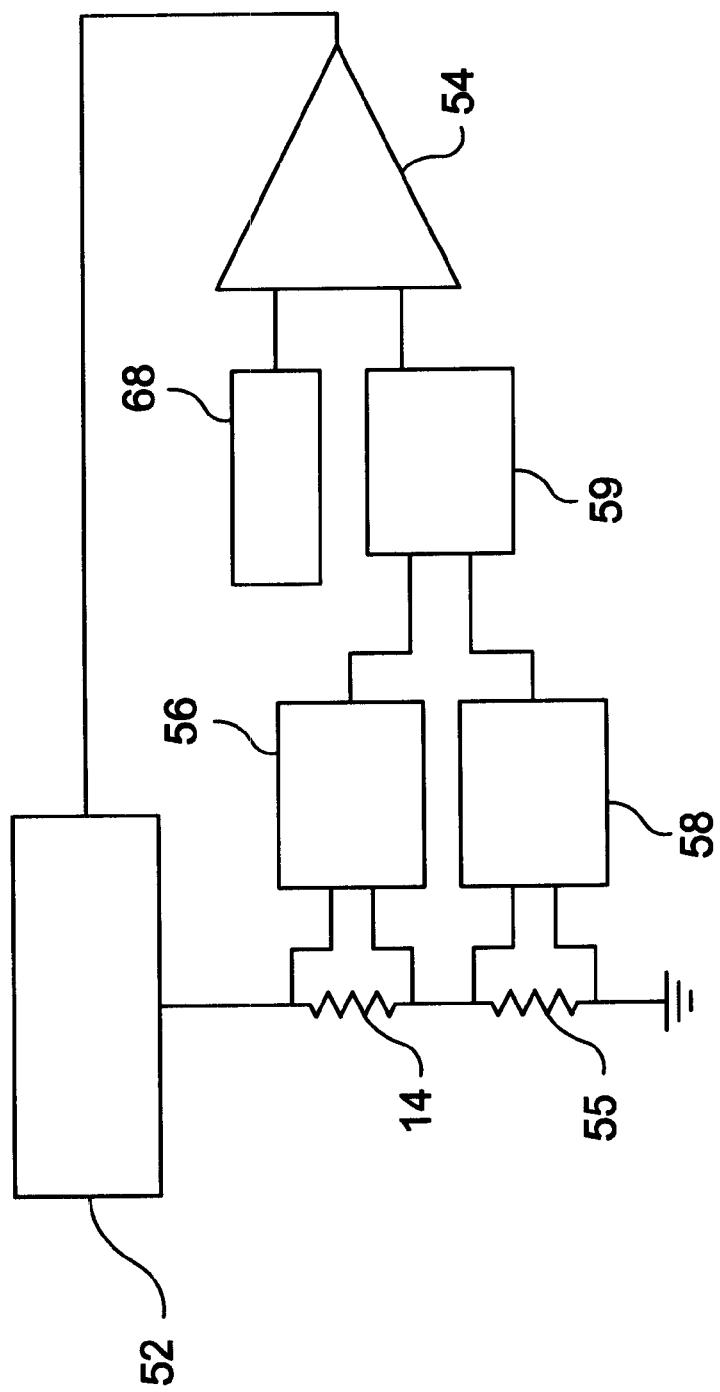
FIG. 8 is a schematic electrical circuit diagram of an alternate embodiment of the present invention.

In another alternative embodiment of the invention, as embodied herein and shown in FIG. 8, the thermally tunable optical device 10 includes a power control circuit using a derived value of the coating resistance. In this embodiment the thermally tunable optical device 10 again relies on the thermal optical properties of the optical fiber device 12 and the thermal electrical properties of the heater 14. In this embodiment the resistance of the heater 14 is found by taking the quotient of signals, either analog or digital, proportional to both the voltage across the heater 14 and the current through the heater 14. When the ambient temperature surrounding the thermally tunable optical device 10 decreases the heater 14 cools and its resistance decreases. The derived resistance value in turn falls below a set point, signaling the power source 52 to increase the current to the heater 14. This increase in current raises the temperature and hence the resistance of the heater 14 bringing the temperature of the heater 14 in the optical fiber device 12 back to its targeted value. In this embodiment the tunable optical device 10 includes an optical fiber device 12 thermally coupled to a heater 14, the heater 14 converts electrical energy to thermal energy. A precision resistor of either fixed or variable resistance is electrically connected in series with the heater 14. A voltage detector 56 is electrically connected to the heater 14 to measure the voltage across the heater 14. The voltage detector 56 outputs a signal corresponding to the voltage across the heater 14. A current detector 58 is electrically connected to the precision resistor 55 to measure the electrical current flowing through it. Because the precision resistor 55 is wired in series with the heater 14, the electrical current flowing through the precision resistor 55 is identical to the electrical current flowing through the heater 14. The output signal from the voltage detector 56 and the output signal from the current detector 58 are used by a divider 59, which is either a digital or an analog circuit that determines the resistance of the heater 14. The divider 59 outputs a signal corresponding to the value of this resistance; this signal is transmitted from the divider to an error detector 54, exemplary of which would be an operational amplifier. The error detector 54 compares the signal from the divider 59 to a preset signal, from a reference signal generator 68, corresponding to the desired resistance of the heater 14. If the signal from the divider 59 is different from the reference signal the error detector generates a control signal to the power source that is providing electrical power to the heater 14. The control signal regulates the amount of power supplied to the heater 14, thus controlling its temperature. For example, if the ambient temperature surrounding the thermally tunable optical device 10 increases, the temperature of the heater 14 increases and the resistance of the heater 14 increases. If the heater 14 was operating at its target resistance value before the ambient temperature increased then the error detector 54 sends a control signal commanding the power source to supply less electrical energy to the heater 14. As less electrical energy is applied to the heater 14 it generates less thermal energy and its temperature decreases, bringing the resistance of the heater 14 back to its target value. Conversely, if the heater 14 is operating at its target resistance value and the ambient temperature surrounding the thermally tunable optical device 10 decreases, the temperature of the heater 14 drops below its desired operating temperature. As the temperature of the heater 14 decreases, its resistance drops below the reference resistance and the error detector 54 generates a control signal to the power source 52. The power source 52 responds by increasing the electrical power supplied to the heater 14. The heater 14 converts this electrical power to thermal energy, increasing its temperature until the heater 14 reaches the reference resistance. This device is tunable by changing the magnitude and/or polarity of the reference signal generator 68 output signal.

Figure 9:
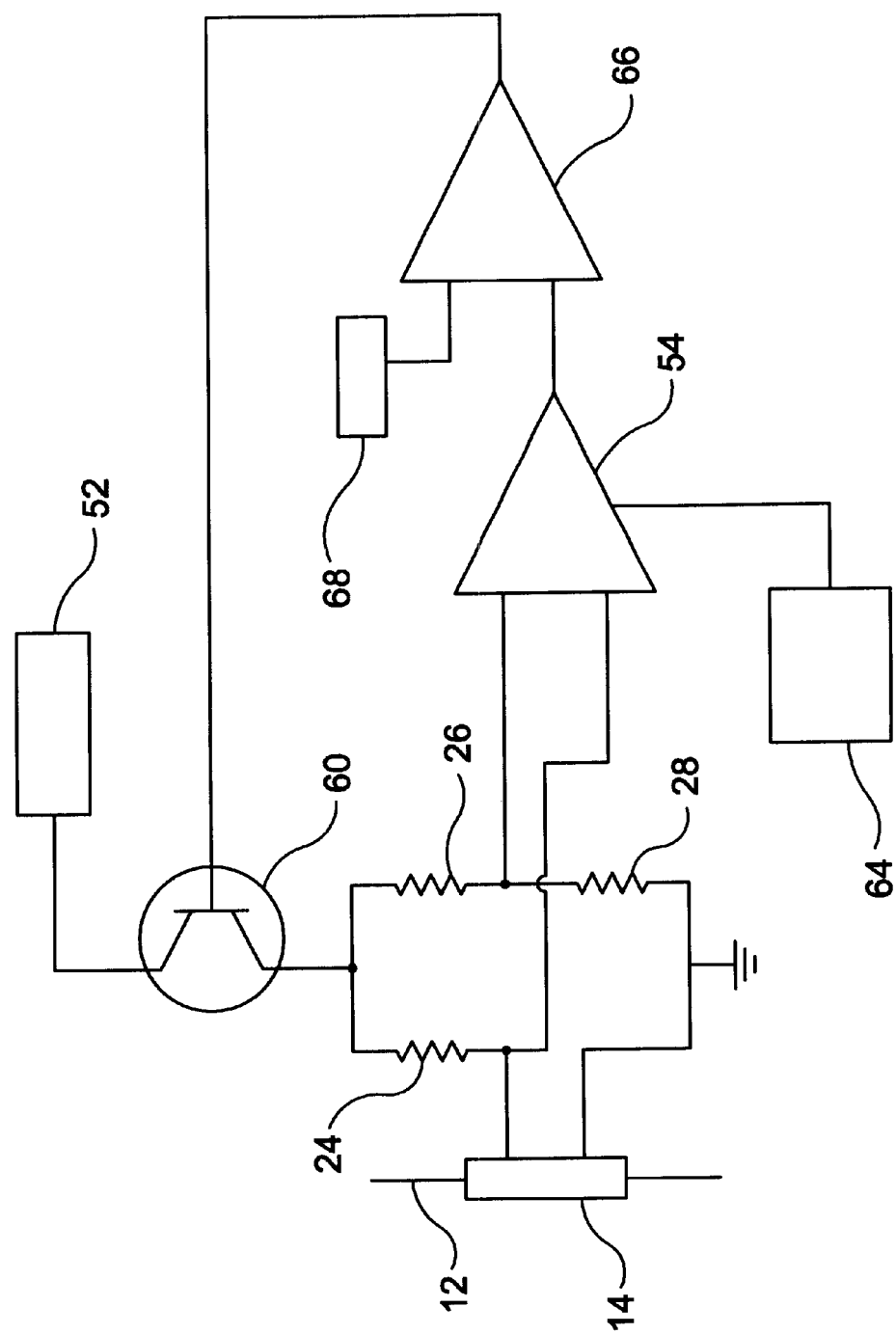
FIG. 9 is a schematic electrical circuit diagram of an alternate embodiment of the present invention.

As embodied herein and depicted in FIG. 9, an alternative embodiment for a thermally tunable optical device includes the following control circuitry. This embodiment of the present invention again takes advantage of the ability of the heater 14 to function as both an output and sensory unit. The heater 14 is wired into a bridge circuit 30, exemplary of which is a Wheatstone bridge circuit as described above. Electrical current is supplied to the thermally tunable optical device 10 by a power source 52. A transistor 60 is electrically interposed between the bridge circuit 30 and the power source 52, such that electrical current must flow through the transistor 60 in order reach the bridge circuit 30. An error detector 54 is electrically connected to the bridge circuit 30. The error detector 54 detects any imbalance in the bridge circuit 30 and produces an output signal. In one embodiment the error detector 54 is an operational amplifier. When the error detector 54 is an operational amplifier the gain of the error detector 54 may be controlled by a gain controller 64 that may be adjusted either manually or by use of digital programming. The output signal from the error detector 54 goes into a summing amplifier 66. The summing amplifier 66 adds the output signal from the error detector 54 to a DC reference voltage signal supplied by a reference signal generator 68. The summing amplifier 66 then outputs a transistor control signal. The transistor control signal is an electrical signal. The transistor control signal regulates the amount of electrical current that flows from the power source 52 through the transistor 60 to the heater 14. If the temperature of the heater 14 is below the desired target temperature, because of a drop in the ambient temperature of the operating environment of the thermally tunable optical device 10, the signal produced by the error detector 54 is of a magnitude and polarity to cause the transistor 60 to allow more electrical current to flow into the bridge circuit 30. As more electrical current is supplied to the bridge circuit 30 the temperature of the heater 14 increases. If ambient temperature of the operating environment of the thermally tunable optical device 10 increase and the temperature of heater 14 rises above a target temperature, the output signal from the error detector 54 causes the transistor 60 to decrease the amount of electrical power supplied to the bridge circuit 30 and the heater 14 cools.

Although the above descriptions illustrate the present invention using optical waveguide fiber devices, the present invention is equally suited for use with non-fiber based optical waveguide elements. Exemplary of non-fiber based optical waveguide elements are planar waveguides and channel waveguide devices.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A tunable optical device comprising:
   an optical fiber device having an optical property that varies with temperature;
   a metal layer thermally coupled to said optical fiber device, having an electrical resistance that varies with temperature;
   a first electrical contact electrically connected to said metal layer;
   a second electrical contact electrically connected to said metal layer, wherein said first and second electrical contacts are separated by a certain distance;
   a power source electrically connected to said first and second electrical contacts; and
   a controller electrically connected to said first and second electrical contacts that measures the electrical resistance of the metal layer between said first and second electrical contacts, wherein said controller compares the measured electrical resistance to a pre-selected resistance and regulates said measured electrical resistance by varying the amount of electrical power supplied by said power source.

2. The tunable optical device of claim 1 further comprising:
   a substrate having a groove engageable with said optical fiber device, wherein said metal layer is disposed between said optical fiber device and the sides of said groove.

3. The tunable optical device of claim 2 wherein said substrate is a tube.

4. The tunable optical device of claim 1 wherein said metal layer is deposited on said optical fiber device.

5. The tunable optical device of claim 1 wherein said controller comprises:
   an amplifier that generates an electrical signal proportionate to a difference between said metal layer resistance and a reference resistance.

6. The tunable optical device of claim 1 wherein said controller further comprises:
   a resistor electrically connected to said metal layer.

7. The tunable optical device of claim 1 wherein said controller comprises:
   a resistor electrically connected in series with said metal layer;
   a voltage detector electrically connected to said first and second electrical contacts, that measures the voltage between said first and second electrical contacts;
   a current detector electrically connected to said resistor, that measures the electrical current in said resistor;
   a resistance calculator electrically connected to said voltage detector and said current detector, that determines the electrical resistance of said metal layer between said first and second electrical contacts and generates an electrical signal corresponding to said determined electrical resistance; and
   an error detector that compares said electrical signal to a reference signal and generates a control signal, which regulates the electrical power supplied by said power source.

8. The tunable optical device of claim 1 wherein said controller comprises:
   a resistor electrically connected in series with said metal layer;
   a voltage detector disposed to measure the voltage between said first and second electrical contacts, that generates a first signal corresponding to said measured voltage;
   a current detector disposed to measure the electrical current in said resistor, that generates a second signal corresponding to said measured current;
   a resistance calculator disposed to receive said first and second signals, that uses said first and second signals to generate a third signal corresponding to the resistance of said metal layer; and
   an error detector that receives said third signal and compares it to a pre-selected reference value and generates a control signal that regulates said power source.

9. The tunable optical device of claim 1 wherein said controller comprises:
   a plurality of resistors electrically connected with said metal layer to form a Wheatstone bridge;
   a digital controller that generates a target voltage;
   a first amplifier having its gain controlled by said target voltage, wherein said first amplifier generates an electrical signal proportionate to a difference between the electrical resistance of said metal layer and the electrical resistance of at least one of said plurality of resistors; and
   a transistor electrically disposed between said power source and said metal layer, wherein said transistor receives said electrical signal from said first amplifier.

10. A tunable optical device comprising:
    an optical fiber device, wherein the optical properties of said optical fiber device vary with temperature;
    a substrate having a groove, said groove disposed to engage said optical fiber device;
    a resistive metal layer deposited on at least a portion of said groove, having an electrical resistance that varies with temperature;
    a first electrical contact electrically connected to said resistive metal layer;
    a second electrical contact electrically connected to said resistive metal layer, wherein said first and second electrical contacts are separated by a certain distance; and a controller connected to said first and second electrical contacts, wherein said controller monitors the electrical resistance of said resistive metal layer between said first and second electrical contacts and adjusts said electrical resistance by applying electrical power to said first and second electrical contacts.

11. The tunable optical fiber device of claim 10 wherein said substrate is a glass cylinder.

12. The tunable optical fiber device of claim 10 further comprising an adhesive that bonds said optical fiber device to said substrate.

13. The tunable optical fiber device of claim 12 wherein said fiber based device is a tapered fiber device.

14. The tunable optical fiber device of claim 12 wherein said fiber based device is chosen from the group consisting of fiber Bragg gratings, long period gratings and Mach-Zehnder devices.

15. The tunable optical device of claim 10 wherein the controller includes:
two precision resistors;
a variable resistor, wherein the two precision resistors and the variable resistor are electrically connected with said metal layer to form a Wheatstone bridge;
a power source for supplying electrical power to said Wheatstone bridge; and
an error detection circuit that provides a control signal to said power source.

16. The tunable optical device of claim 15 wherein the resistance of the resistive metal layer is selected by adjusting the electrical resistance of said variable resistor.

17. A tunable optical device comprising:
an optical fiber device, wherein the optical properties of said optical fiber device vary with temperature;
a resistive heater disposed to substantially surround said optical fiber device, said resistive heater having an electrical resistance that varies with temperature, said heater converting electrical power to thermal energy;
an electrical power source electrically connected to said heater, said electrical power source supplying electrical power to said heater;
a sensor that measures said electrical resistance;
a comparator that compares said electrical resistance to a reference resistance and generates an output signal; and
a controller that uses said output signal to regulate the amount of electrical power delivered to said heater.

18. A tunable optical device comprising:
a fiber bragg grating;
a heater disposed to substantially surround said fiber bragg grating, said heater having an electrical resistance that varies with temperature, said heater converting electrical power to thermal energy;
an electrical power source electrically connected to said heater, said electrical power source supplying electrical power to said heater;
a sensor that measures said electrical resistance;
a comparator that compares said electrical resistance to a reference resistance and generates an output signal; and
a controller that uses said output signal to regulate the amount of electrical power delivered to said heater.

19. A tunable optical device comprising:
an optical filter having optical properties that vary with temperature;
a heater thermally coupled to said optical filter, said heater having an electrical resistance that changes with temperature, wherein said heater converts electrical power to thermal energy; and
a controller electrically connected to said heater, said controller measuring said electrical resistance and providing electrical power to said heater, wherein said controller compares said electrical resistance to a target electrical resistance and adjust the amount of electrical power provided to bring said electrical resistance into a range with said target electrical resistance.

20. A tunable optical device comprising:
an optical fiber device having optical properties that vary with temperature;
a plurality of heaters thermally coupled to said optical fiber device disposed along the length of said optical fiber device, each of said plurality of heaters having an electrical resistance that changes with temperature, wherein each of said plurality of heaters converts electrical power to thermal energy; and
a controller electrically connected to said plurality of heaters, said controller measuring said electrical resistances and providing electrical power to said plurality of heaters, wherein said controller compares said electrical resistances to at least one target electrical resistance and adjusts the amount of electrical power provided to bring said electrical resistances into a range with said at least one target electrical resistance.

21. The tunable optical device of claim 20 wherein each of said plurality of heaters comprises a resistive heating element.

22. The tunable optical device of claim 21 wherein said resistive heating element is a metal layer.

23. The tunable optical device of claim 20 further comprising a substrate disposed to support said plurality of heaters.

24. A tunable optical device comprising:
an optical fiber device having optical properties that vary with temperature;
a heater thermally coupled to said optical fiber device, said heater having an electrical resistance that changes with temperature, wherein said heater converts electrical power to thermal energy;
a power source electrically connected to said heater;
a transistor electrically disposed between said power source and said heater; and
a controller having:
a plurality of resistors electrically connected to said heater to form a Wheatstone bridge circuit;
an error detector electrically connected to said Wheatstone bridge circuit, wherein said error detector determines the electrical state of said Wheatstone bridge circuit and generates an electrical signal corresponding to the electrical state of said Wheatstone bridge circuit;
a gain controller electrically connected to said error detector, wherein said gain controller generates a gain control signal that controls the operating properties of said optical fiber device; and
a summing device electrically connected to said transistor and disposed to receive said electrical signal generated by said error detector, wherein said summing device generates a transistor control signal, said transistor control signal regulating the electrical power supplied to said heater by said power source.

25. A tunable optical device comprising:
- an optical waveguide device having an optical property that varies with temperature;
- a metal layer thermally coupled to said optical waveguide device, having an electrical resistance that varies with temperature;
- a first electrical contact electrically connected to said metal layer;
- a second electrical contact electrically connected to said metal layer, wherein said first and second electrical contacts are separated by a certain distance;
- a power source electrically connected to said first and second electrical contacts; and
- a controller electrically connected to said first and second electrical contacts that measures the electrical resistance of the metal layer between said first and second electrical contacts, wherein said controller compares the measured electrical resistance to a pre-selected resistance and regulates said measured electrical resistance by varying the amount of electrical power supplied by said power source.

26. The tunable optical device of claim 25 wherein said metal layer is deposited on said optical waveguide device.

27. The tunable optical device of claim 25 wherein said controller comprises:
- an amplifier that generates an electrical signal proportionate to a difference between said metal layer resistance and a reference resistance.

28. The tunable optical device of claim 25 wherein said controller further comprises:
- a resistor electrically connected to said metal layer.

29. The tunable optical device of claim 25 wherein said controller comprises:
- a resistor electrically connected in series with said metal layer;
- a voltage detector electrically connected to said first and second electrical contacts, that measures the voltage between said first and second electrical contacts;
- a current detector electrically connected to said resistor, that measures the electrical current in said resistor;
- a resistance calculator electrically connected to said voltage detector and said current detector, that determines the electrical resistance of said metal layer between said first and second electrical contacts and generates an electrical signal corresponding to said determined electrical resistance; and
- an error detector that compares said electrical signal to a reference signal and generates a control signal, which regulates the electrical power supplied by said power source.

30. The tunable optical device of claim 25 wherein said controller comprises:
- a resistor electrically connected in series with said metal layer;
- a voltage detector disposed to measure the voltage between said first and second electrical contacts, that generates a first signal corresponding to said measured voltage;
- a current detector disposed to measure the electrical current in said resistor, that generates a second signal corresponding to said measured current;
- a resistance calculator disposed to receive said first and second signals, that uses said first and second signals to generate a third signal corresponding to the resistance of said metal layer; and
- an error detector that receives said third signal and compares it to a pre-selected reference value and generates a control signal that regulates said power source.

31. The tunable optical device of claim 25 wherein said controller comprises:
- a plurality of resistors electrically connected with said metal layer to form a Wheatstone bridge;
- a digital controller that generates a target voltage;
- a first amplifier having its gain controlled by said target voltage, wherein said first amplifier generates an electrical signal proportionate to a difference between the electrical resistance of said metal layer and an electrical resistance of at least one of said plurality of resistors; and
- a transistor electrically disposed between said power source and said metal layer, wherein said transistor receives said electrical signal from said first amplifier.

32. A tunable optical device comprising:
- an optical waveguide device, wherein the optical properties of said optical waveguide device vary with temperature;
- a resistive heater disposed to substantially surround said optical waveguide device, said resistive heater having an electrical resistance that varies with temperature, said heater converting electrical power to thermal energy;
- an electrical power source electrically connected to said resistive heater, said electrical power source supplying electrical power to said resistive heater;
- a sensor that measures said electrical resistance;
- a comparator that compares said electrical resistance to a reference resistance and generates an output signal; and
- a controller that uses said output signal to regulate the amount of electrical power delivered to said resistive heater.

* * * * *